United States Patent [19]

Suzuki et al.

[11] 4,394,739
[45] Jul. 19, 1983

[54] AUTOMATIC SPEED CONTROL SYSTEM FOR AN AUTOMOTIVE VEHICLE

[75] Inventors: Kouichi Suzuki; Kazuyuki Mori, both of Yokohama, Japan

[73] Assignee: Nissan Motor Company, Limited, Kanagawa, Japan

[21] Appl. No.: 224,196

[22] Filed: Jan. 12, 1981

[30] Foreign Application Priority Data

Jan. 14, 1980 [JP] Japan .................................. 55-2140

[51] Int. Cl.³ ............................................. B60K 31/00
[52] U.S. Cl. .................................... 364/426; 364/424; 364/565; 180/176; 180/179; 123/352
[58] Field of Search ....................... 364/424, 426, 565; 340/62; 180/170, 176, 177, 179; 123/352

[56] References Cited

U.S. PATENT DOCUMENTS

| 3,885,137 | 5/1975 | Ooya et al. | 180/176 |
| 3,891,046 | 6/1975 | Oicles | 180/176 |
| 3,941,202 | 3/1976 | Sorkin | 180/176 |
| 3,952,829 | 4/1976 | Gray | 180/177 |
| 4,117,903 | 10/1978 | Fleischer et al. | 364/424 |
| 4,140,202 | 2/1979 | Noddings et al. | 123/352 |
| 4,254,844 | 3/1981 | Collonia | 180/179 |
| 4,273,208 | 6/1981 | Liermann | 180/176 |

Primary Examiner—Gary Chin
Attorney, Agent, or Firm—Lowe, King, Price & Becker

[57] ABSTRACT

Automatic speed control system is provided which has circuitry responsive to the turning off of the system's restart switch. This circuitry activates the control upon detection of a control signal, generated as a function of the difference between the actual vehicle speed and the set speed, when the restart switch switches off. In the system according to the present invention, the vehicle is effectively prevented from unexpected acceleration caused by the misoperation of the restart switch or damage thereof.

22 Claims, 3 Drawing Figures

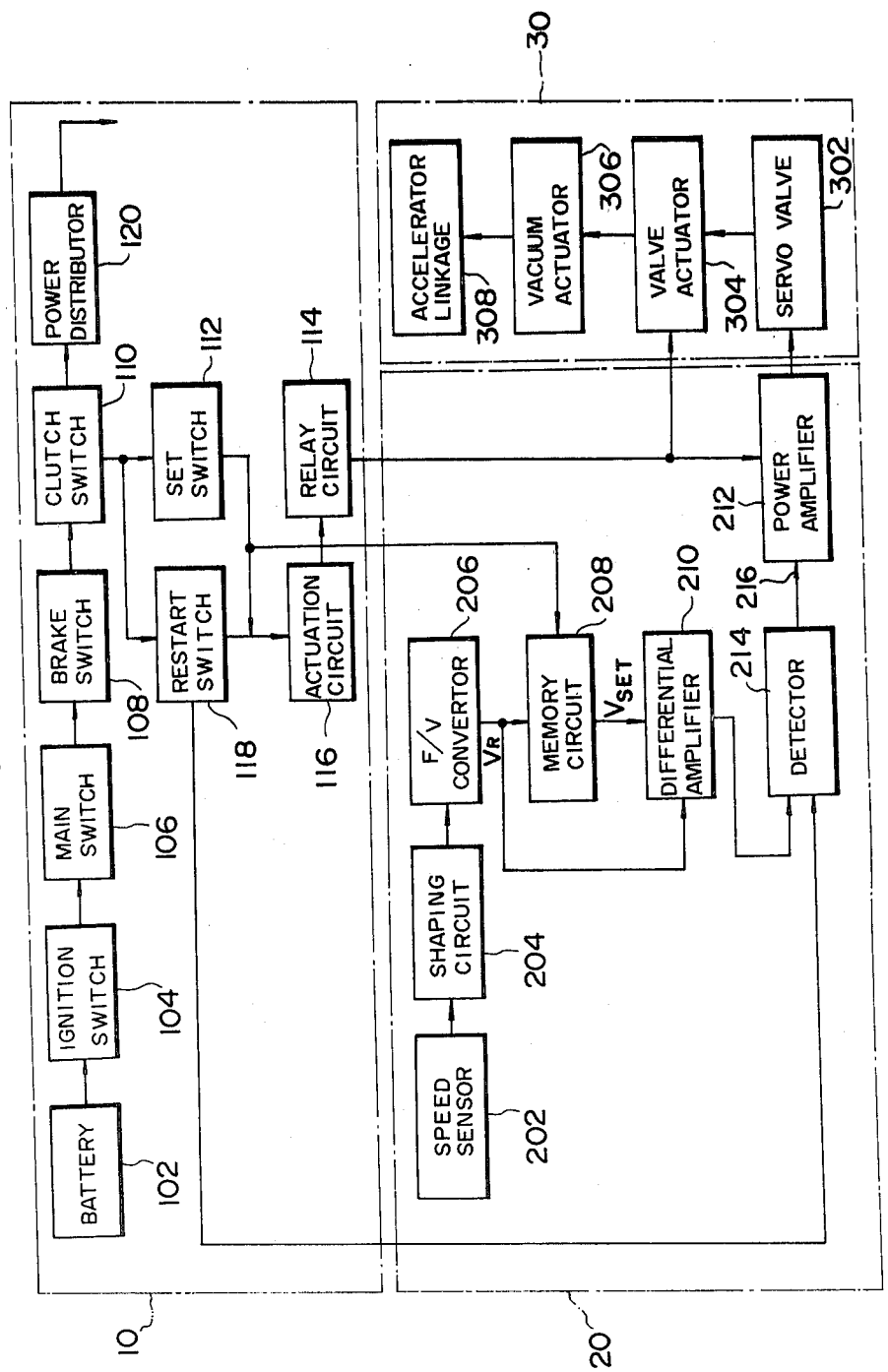

FIG. 2

| | NORMAL OPERATION | | | | | ABNORMAL CONDITION |
|---|---|---|---|---|---|---|
| | $T_0 \sim T_1$ | $T_1 \sim T_2$ | $T_2 \sim T_3$ | $T_3 \sim T_4$ | $T_4 \sim$ | |
| DIFFERENTIAL AMPLIFIER OUTPUT | H | O | H | H | H | H |
| RESTART SWITCH OUTPUT | L | L | H | L | L | H |
| DETECTOR OUTPUT | H | O | L | H | H | L |
| VEHICLE SPEED | SET | DECELE-RATION | DECELE-RATION | ACCELE-RATION | SET | DECELE-RATION |

REMARK  H : HIGH LEVEL

L : LOW LEVEL

O : INOPERATIVE POSITION

FIG. 3

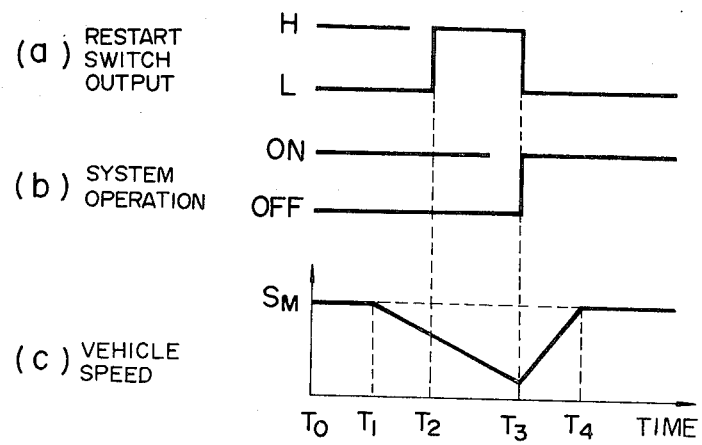

(a) RESTART SWITCH OUTPUT (b) SYSTEM OPERATION (c) VEHICLE SPEED

AUTOMATIC SPEED CONTROL SYSTEM FOR AN AUTOMOTIVE VEHICLE

BACKGROUND OF THE INVENTION

The present invention relates generally to an automatic speed control system for an automotive vehicle which controls the vehicle speed at a desired or pre-set value. More specifically, the invention relates to an automatic vehicle speed control system capable of preventing the vehicle from accelerating unexpectedly to return the vehicle speed to the set value after the control operation thereof has been interrupted and the vehicle has been decelerated by the application of the brake or the release of the clutch.

As is well known, various automatic speed control systems have been developed and proposed for mechanically, electrically or electronically controlling the vehicle speed to a desired value. For driving the vehicle at a constant speed, the desired speed is set into the control system and the control system controls the vehicle speed to reduce the difference between the actual vehicle speed and the pre-set speed to zero. One means provided is that whereby the control system is operated by the driver to set a desired vehicle speed. The set speed is stored as an analog signal to be compared with a signal indicative of the actual speed. According to the difference between the set speed and the actual speed, the control system automatically controls vehicle acceleration ion. In the automatic speed control system, a restart switch is provided which is operated when the vehicle is returned to the controlled mode after the control operation is interrupted by applying the brake or releasing the clutch.

When the restart switch is operated, the vehicle is immediately accelerated to return it to the set speed. There is a disadvantage in the conventional control system, in that if the restart switch is damaged and cannot be turned off, the vehicle is accelerated as soon as the brake is released or the clutch is engaged. This could be dangerous since the driver may not intend to accelerate immediately.

SUMMARY OF THE INVENTION

Therefore, it is an object of the present invention to provide an automatic speed control system for an automotive vehicle capable of inhibiting the vehicle's acceleration after the control operation is interrupted.

A further specific object of the invention is to provide the automatic speed control system with a means for preventing the control system from becoming operative if the restart switch is damaged and cannot be returned to its off position.

To accomplish the above-mentioned and other objects of the present invention, an automatic speed control system is provided which has a means responsive to the turning off of the restart switch. This means activates the control system when a control signal is generated based on the difference between the actual vehicle speed and the set speed, and when the restart switch is switched off. In the system according to the present invention, the vehicle is effectively prevented from unexpected acceleration caused by the misoperation of the restart switch or damage thereof.

BRIEF DESCRIPTION OF THE DRAWINGS

The present invention will be better understood from the detailed description of the invention given hereinbelow and from the accompanying drawings of the preferred embodiment, which, however, should not be taken as limitative of the invention but only as an elucidation and explanation thereof.

In the drawings:

FIG. 1 is a block diagram of a preferred embodiment of an automatic speed control system according to the present invention;

FIG. 2 is a table showing the function of the restart switch/detector combination of the control system of FIG. 1; and FIG. 3 is a chart showing a time chart of the function of the restart switch and the detector.

DESCRIPTION OF THE PREFERRED EMBODIMENT

Reference is now made to the drawings, particularly to FIG. 1 in which is illustrated a preferred embodiment of an automatic speed control system for an automotive vehicle according to the present invention. The automatic speed control system generally comprises a power supply circuit 10 and a control circuit 20. The power supply circuit supplies electric power to the control circuit 20 and includes a variety of switching means. In the preferred embodiment, the electric power supply circuit 10 consists of a vehicle battery 102, an ignition switch 104, a main switch 106, a brake switch 108 and a clutch switch 110. Further, the power supply circuit 10 includes a set switch 112 for pre-setting the desired vehicle speed, and a relay circuit 114 to ensure that the electric power continues to be applied to the control circuit 20. The relay circuit 114 accompanies an actuation circuit 116 which operates the relay circuit 114 when the power supply circuit 10 is turned on. The power supply circuit 10 further comprises a restart switch 118.

The restart switch 118 is turned on to return the vehicle to the controlled mode after the control operation is interrupted. In practice, the restart switch 118 can be constructed in any suitable manner, however, in the shown embodiment an auto-return type push switch is preferred, normally kept in the open position. In this way, the restart switch 118 is normally in the open position and closes only when it is manually closed.

The brake switch 108 detects in application of the brake pedal (not shown) and cuts the power supply circuit 10 in response. Similarly, the clutch switch 110 detects an application of the clutch pedal (not shown) and cuts the power supply circuit 10 in response. The brake switch 108 and the clutch switch 110 are connected to the battery 102, ignition switch 104 and main switch 106 in series. Also, the brake switch 108 and the clutch switch 110 are interposed between the above-mentioned switches and an electric power distributor 120 for supplying electric power for other electrical equipment.

It will be appreciated that though the above is a specific arrangement of switches in series, the construction of the power supply circuit 10 is not essential to the present invention and therefore the arrangement thereof can be modified in any suitable manner.

The control circuit 20 comprises a vehicle speed sensor 202, a shaping circuit 204, frequency-voltage converter 206, a memory circuit 208, a differential amplifier 210, and a power amplifier 212. The vehicle speed sensor 202 determines the vehicle speed in a well known manner such as by means of an electromagnetic pick-up on the wheel shaft. The vehicle speed sensor 202 generates a pulse signal, the frequency of which corresponds to the vehicle speed. The pulse signal indicating the vehicle speed is input to the frequency-voltage converter 206 through the shaping circuit 204. The frequency-voltage converter 206 generates an analog signal $V_R$ corresponding to the frequency of the input pulse signal.

The set switch 112 is connected to the memory circuit 208 to operate the latter. The memory circuit 208 receives the analog signal from the frequency-voltage converter 206 and the command signal from the set switch 112. Responding to the command signal, the memory unit 208 becomes set to hold the analog signal value of the frequency-voltage converter which indicates the pre-set desired speed of the vehicle. The memory circuit 208 generates a set signal $V_{SET}$ having a value corresponding to the set value. The analog signal fed from the frequency-voltage converter 206 is also fed to the differential amplifier 210 and is compared with the signal value of the set signal $V_{SET}$. The differential amplifier 210 amplifies the difference between the signals indicating the actual vehicle speed and the set vehicle speed. The differential amplifier 210 generates a control signal for controlling the actuation means 30 to reduce the difference between the actual vehicle speed and the set speed to zero. The control signal is amplified by the power amplifier 212 and is then input to the actuation means 30.

The actuation means 30 comprises a servo valve 302, a valve actuator 304, a vacuum actuator 306 and an accelerator linkage 308. The servo valve 302 responds to the control signal fed from the control circuit 20 to produce a control vacuum which has a pressure indicating the value of the control signal. The valve actuator 304 is operated by the control vacuum fed from the servo valve 302 to actuate the vacuum actuator 306. Responding to the operation of the vacuum actuator 306, the accelerator linkage 308 operates to reduce the difference between the actual vehicle speed and the set speed to zero. In practice, the accelerator linkage 308 is mechanically connected to a control unit of the carburetor (not shown) to control the air flow rate therethrough by the operation thereof.

In the shown embodiment, a detector 214 is interposed between the differential amplifier 210 and the power amplifier 212. The construction and the function of the detector 214 is substantially similar to a NAND circuit. Namely, the output of the detector 214 applied to a terminal 216 attains a high level only when the output of the differential amplifier 210 is at a high level and the output of the restart switch 118 is at a low level.

Now, follows an explanation of the operation of the automatic control system according to the present invention constructed as above.

For setting the desired vehicle speed, the set switch 112 is turned on. The memory circuit 208 then responds to the turning on of the set switch 112 by holding the signal voltage of the analog signal $V_R$ indicating the vehicle speed determined by the vehicle speed sensor 202. Thereafter, the memory circuit 208 outputs a constant voltage of set signal $V_{SET}$. The set signal $V_{SET}$ is fed to the differential amplifier 210. The differential amplifier 210 compares the voltage of the set signal $V_{SET}$ with the voltage of the signal $V_R$ indicating the actual vehicle speed. Based on this voltage difference, the differential amplifier 210 generates a control signal to modify the actual vehicle speed to reduce the difference between the set speed and the actual vehicle speed to zero. Thereby, the vehicle speed is adjusted to the set vehicle speed, automatically.

The control system is kept in operation until either the brake is applied and thereby the brake switch 108 is turned off or the clutch is released and thereby the clutch switch 110 is turned off.

When the brake is applied or the clutch released, the power supply circuit 10 is cut off stopping the supply of electric power to the control circuit 20, thereby interrupting the operation effected by the control system.

To return to the control mode, the restart switch 118 is turned on, the actuation circuit 116 becomes operative and thus the relay circuit 114 becomes operative. Therefore, if the restart switch 118 returns to the normal off-position, power can be supplied to the control circuit 20 through the relay circuit 114. At this time, by turning on the restart switch 118, a high level output is input to the detector 214 and by returning to the normal off-position, the restart switch 118 outputs a low level signal to the detector 214. As stated above, the detector 214 also receives the output of the differential amplifier 210. The detector 214 functions as illustrated in FIG. 2, namely, as a NAND circuit, the output thereof being a low level if both its inputs are at high levels. As seen from FIG. 2, the output of detector 214 is at a high level only its two inputs are at different levels, such as when the output of the differential amplifier is at a high level and the output of the restart switch is low level.

The function of the restart switch 118 together with that of the detector 214 will be described in more detail with reference to FIG. 3. In FIG. 3, assume that brake is applied or the clutch is released at a time $T_1$ during the automatic speed control driving condition, and that the power supply circuit 10 is thus opened to stop the supply of electric power to the control circuit 20. Thus, the vehicle is decelerated. If the driver turns on the restart switch 118 at a time $T_2$ and the restart switch is kept at that position until a time $T_3$, during that period the detector 214 outputs a low level signal to de-activate the control circuit 20. On returning the restart switch 118 to the normal position and thereby returning the output thereof to low level, the detector 214 outputs the high level signal to activate the power amplifier 212 to output the control signal to the actuation means 30.

The actuation means 30 is activated by the control signal fed from the control circuit 20. Namely, when the restart switch 118 is returned to the normal position, the servo valve 302 operates to produce the control vacuum indicating the value of the control signal. The valve actuator 304 therefore becomes operative to actuate the vacuum actuator 306 to control the accelerator linkage 308. Thus, the vehicle accelerates until the pre-set speed is reached.

What is claimed is:
1. An automatic speed control system for an automotive vehicle which adjusts the vehicle speed to a pre-set constant speed, comprising:
a first means for setting the vehicle speed at a desired value and comparing said set speed with the actual vehicle speed to obtain the difference therebetween, said first means generating a control signal corresponding to the determined difference;
a second means for controlling an accelerator of the vehicle in response to said control signal in a control mode of the control system to reduce the difference between the set speed and the actual speed to zero;

a third means connected to disable application of said control signal to said second means for interrupting the operation of the control system;

a fourth means comprising a resume means, said fourth means connected for enabling application of said control signal to said second means, activated for returning the control system to operation after interruption of the operation thereof and for returning the vehicle speed to said set speed; and a fifth means connected to said fourth means for inhibiting the control system from entering into the control mode when said fourth means is activated until said fourth means is deactivated thereafter, thereby delaying the response of said second means to the operation of said fourth means to return the vehicle speed to said set speed until said fourth means is again deactivated, whereby erroneous operation of said second means due to a faulty resume means is prevented.

2. An automatic speed control system as set forth in claim 1, wherein said third means comprises a brake switch responding to the application of the brake, whereby a signal is generated to interrupt the operation of said control system as the brake is applied.

3. An automatic control system as set forth in claim 1, wherein said third means comprises a clutch position switch responding to the release of the clutch, whereby a signal is generated to interrupt the operation of said control system as the clutch is released.

4. An automatic speed control system as set forth in claim 1, 2 or 3, wherein said fifth means comprises a detector means, said detector means connected to receive signals from said first means and from said fourth means for becoming inoperative, and thereby inhibiting the control system from entering the control mode, when the signals from both said first and fourth means are simultaneously indicative of said actual vehicle speed not exceeding the set speed and of activation of said fourth means to return the control system to operation and for thereafter becoming operative, thereby returning the control system to operation in its control mode, when the signal from said fourth means is subsequently indicative of deactivation thereof.

5. The system as set forth in claim 4 wherein said first means outputs a signal at a first level when said set speed exceeds the actual vehicle speed and at a second level otherwise, said fourth means outputs a signal at said first level when activated to return the control system to operation and at said second level otherwise, and said detector means comprises a logic gate means responsive to said signals from said first and fourth means and operative when said signals are at the same logic levels for inhibiting the control system from entering said control mode, and for activating the control system into said control mode when said signals are at different logic levels.

6. An automatic speed control system for an automotive vehicle which adjusts the vehicle speed to a pre-set constant speed, comprising:

a speed sensor which determines the vehicle speed and generates a sensor signal indicative of determined vehicle speed;

a setting means operative at a desired vehicle speed which generates a reference signal indicative of a set speed of the vehicle;

a control signal generator which compares said sensor signal and said reference signal to obtain the difference therebetween and which generates a control signal based on the determined difference;

a control means operable to control an accelerator according to said control signal and which reduces the difference between the set speed and the actual speed;

a second means connected for disabling said control signal and responsive to the deceleration of the vehicle to interrupt operation of the control system;

a third means comprising a resume means, said third means connected for enabling said control signal and operable to return the control system to operative mode for returning the vehicle speed to said set speed, after the operation is interrupted by said second means; and a fourth means incorporated with said third means to prevent the control means from entering an operative condition thereof in response to the operative condition of said third means and to cause the control means to enter its operative condition in response to an subsequent inoperative condition of said third means, whereby erroneous operation of said control means due to a faulty resume means is prevented.

7. An automatic speed control system as set forth in claim 6, wherein said fourth means receives said control signal and a signal fed from said third means and functions as a NAND gate to operate the control system when said control signal is at a high level and said signal from said third means is at a low level.

8. An automatic speed control system as set forth in claim 6 or 7, wherein said second means comprises a brake switch responding to the application of the brake, whereby an interruption signal is generated as the brake is applied.

9. An automatic speed control system as set forth in claim 6 or 7, wherein said second means comprises a clutch switch responding to a disconnection of the clutch whereby an interruption signal is generated as the clutch is disconnected.

10. An automatic speed control system as set forth in claim 6 or 7, wherein said control means includes a memory means responsive to a set switch for holding a sensor signal value indicating the desired vehicle speed and for generating a constant value of said reference signal corresponding to said value of sensor signal.

11. In an automatic speed control system for an automotive vehicle which adjusts the vehicle speed to a desired constant speed, which system includes a speed sensor for determining the vehicle speed and which generates a sensor signal corresponding to that speed, a control means determining the difference between the set speed and the actual vehicle speed and which generates a control signal responsive to which an adjusting means adjusts vehicle speed to reduce the difference between the set speed and the actual speed to zero, an interruption means for interrupting operation of the control system responsive to the application of the vehicle's brake and/or the disconnection of the vehicle's clutch and a restart means operable for generating a signal for returning the vehicle speed to said set speed after interrupting the control operation of the control system, a method for making the system fail-safe even when the restart means tends to induce failure of the system operation comprising the steps of:

inhibiting operation of the adjusting means during the period of operation of said restart means; and activating the adjusting means upon determining that the restart means has returned to an inoperative condition, whereby erroneous operation of said adjusting means due to a faulty restart means is prevented.

12. A method as set forth in claim 11, wherein said system is provided with a means functioning as a NAND gate which receives said control signal and the signal from said restarting means and comprising the further step of transmitting the control signal to said adjusting means when said control signal is at a high level and said signal from said restart means is at a low level.

13. A method as set forth in claim 11 or 12, wherein said restarting means includes a normally-open switch means and comprising the step of causing said system to be operative responsive to an opened condition of said switch means.

14. A method as set forth in claim 13 wherein said switch means is incorporated with said adjusting means and comprising the step of causing said means functioning as a NAND gate to become operative when the output of said restarting means is at a low level and the output of the control means is at a high level.

15. An automatic cruise control system for an automotive vehicle comprising:

a vehicle speed sensor for producing a vehicle speed signal representative of the vehicle speed;

a preset speed signal generator means for producing a preset speed signal representative of the preset speed, said preset speed signal genertor means being variable for varying the preset speed as desired;

a control means for comparing said vehicle speed signal value and said preset signal value to produce a control signal indicative of the difference therebetween, said control means feeding said control signal to an accelerator means of the vehicle for controlling the vehicle speed to said preset speed;

a disable signal generator means for detecting a preselected disabling condition in the vehicle operation for disabling said control means as said predetermined disabling condition is detected; and a resume switch means adapted for resuming said cruise control and having an inoperative condition and an operative condition, for producing and maintaining a resume signal for resuming said cruise control operation, said resume signal maintained as long as said resume switch means is in its operative condition, which resume signal actuates said control means for resuming said cruise control operation when said resume switch means returns to its inoperative condition.

16. The system as set forth in claim 15, wherein said disable signal generator means is connected for detecting an application of a brake of the vehicle.

17. The system as set forth in claim 15, wherein said disable signal generator means is connected for detecting a release of a clutch of the vehicle.

18. The system as set forth in any one of claims 15, 16 or 17, wherein said control means includes a gate means which is arranged to close responsively to production of said resume signal in the presence of said control signal.

19. In an automatic cruise control system for an automotive vehicle for controlling a vehicle driving speed at a preset constant speed, and including a means for disabling cruise control when a preselected disabling condition is established, and a resume means having an inoperative condition and an operative condition for generating a resume signal to resume cruise control after termination of the disabling condition;

a method for resuming the cruise control after said preselected disabling condition is terminated, comprising the steps of:

detecting termination of said preselected disabling condition;

producing a control signal depending upon a difference between said preset speed and a measured vehicle speed for controlling the vehicle driving speed at the preset constant speed;

producing a resume signal for resuming cruise control, after the control is disabled by detection of the disabling condition;

detecting an AND condition of said control signal and said resume signal for holding said control system in an inoperative condition as long as said AND condition is maintained; and resuming said cruise control in response to a return of the resume means to its inoperative condition and termination of said resume signal as detected by cessation of said AND condition.

20. The method as set forth in claim 19, wherein said preselected disabling condition is established by the step of detecting application of a brake of the vehicle.

21. The method as set forth in claim 19 or 20, wherein said preselected disabling condition is established by the step of detecting a release of a clutch of the vehicle.

22. In an automatic cruise control system for an automotive vehicle having an engine control section, a speed command section providing a speed difference signal to said engine control section, said speed difference signal representing a difference between a preset reference speed and actual vehicle speed, disabling means for disabling said engine control section and a restart means having an inoperative condition and an operative condition for generating a restart signal to resume operation of said engine control section subsequent to disabling thereof by said disabling means, the improvement comprising:

means for delaying resumption of operation of said control system until termination of said restart signal generated by said restart means, including first means connected for receiving said difference signal, second means connected for receiving said restart signal, and third means, connected to said first and second means, for passing said speed difference signal to said engine control section for resuming operation of said engine control section only after said restart means has returned to an inoperative condition, after termination of said restart signal, whereby erroneous operation of said engine control section due to a faulty restart means is prevented.

* * * * *